US009564005B2

(12) United States Patent
Bennett

(10) Patent No.: US 9,564,005 B2
(45) Date of Patent: Feb. 7, 2017

(54) GAMING MACHINE WITH INTERACTIVE BONUSING

(75) Inventor: Nicholas Luke Bennett, Manly Vale (AU)

(73) Assignee: ARISTOCRAT TECHNOLOGIES AUSTRALIA PTY LIMITED, North Ryde (AU)

(*) Notice: Subject to any disclaimer, the term of this patent is extended or adjusted under 35 U.S.C. 154(b) by 0 days.

(21) Appl. No.: 13/252,005

(22) Filed: Oct. 3, 2011

(65) Prior Publication Data

US 2012/0021817 A1 Jan. 26, 2012

Related U.S. Application Data

(63) Continuation of application No. 11/704,590, filed on Feb. 8, 2007, now abandoned, which is a continuation (Continued)

(30) Foreign Application Priority Data

Feb. 11, 2000 (AU) ....................................... PQ5564

(51) Int. Cl.
*A63F 13/00* (2014.01)
*G07F 17/32* (2006.01)
*A63F 1/00* (2006.01)

(52) U.S. Cl.
CPC ........... *G07F 17/3244* (2013.01); *G07F 17/32* (2013.01); *G07F 17/3262* (2013.01); *A63F 2001/008* (2013.01)

(58) Field of Classification Search
CPC ............................. G07F 17/3244; G07F 17/32

(Continued)

(56) References Cited

U.S. PATENT DOCUMENTS 4,695,053 A 9/1987 Vazquez, Jr. et al.
5,704,835 A 1/1998 Dietz, II (Continued)

FOREIGN PATENT DOCUMENTS

AU 725692 7/1998
AU 1999/17318 A1 9/1999

(Continued)

OTHER PUBLICATIONS

International Search Report of PCT/AU01/00044, dated Mar. 16, 2001.

(Continued)

*Primary Examiner* — Omkar Deodhar
*Assistant Examiner* — Eric M Thomas
(74) *Attorney, Agent, or Firm* — Armstrong Teasdale LLP

(57) ABSTRACT

A gaming machine has a display and a game controller arranged to control images on the display. The game controller is arranged to playa game wherein one or more random events are caused to be displayed on the display and, if a predefined winning event of combination of events results, the machine awards a prize. A predetermined symbol from a set of symbols of the game is selected as a bonus symbol. The display is an interactive display means such that, when at least one of the bonus symbols appears then, by a player touching a part of the display overlying the, or each, occurrence of the bonus symbol, a bonus prize is revealed in respect of the, or each, bonus symbol.

14 Claims, 8 Drawing Sheets

Related U.S. Application Data of application No. 10/182,427, filed as application No. PCT/AU01/00044 on Jan. 18, 2001, now abandoned.

(58) Field of Classification Search
USPC ........................................................ 463/16–20
See application file for complete search history.

(56) References Cited

U.S. PATENT DOCUMENTS

| | | | |
|---|---|---|---|
| 5,722,891 | A | 3/1998 | Inoue |
| 5,766,074 | A | 6/1998 | Cannon et al. |
| 5,935,002 | A | 8/1999 | Falciglia |
| 5,980,384 | A | 11/1999 | Barrie |
| 5,984,781 | A | 11/1999 | Sunaga |
| 6,012,982 | A | 1/2000 | Piechowiak et al. |
| 6,015,346 | A | 1/2000 | Bennett |
| 6,053,813 | A | 4/2000 | Mathis |
| 6,056,642 | A | 5/2000 | Bennett |
| 6,059,289 | A | 5/2000 | Vancura |
| 6,089,976 | A * | 7/2000 | Schneider et al. .............. 463/16 |
| 6,095,921 | A | 8/2000 | Walker et al. |
| 6,102,798 | A | 8/2000 | Bennett |
| 6,126,165 | A | 10/2000 | Sakamoto |
| 6,142,875 | A | 11/2000 | Kodachi et al. |
| 6,146,273 | A | 11/2000 | Olsen |
| 6,155,925 | A | 12/2000 | Giobbi et al. |
| 6,159,097 | A | 12/2000 | Gura |
| 6,159,098 | A | 12/2000 | Slomiany et al. |
| 6,165,070 | A | 12/2000 | Nolte et al. |
| 6,168,522 | B1 | 1/2001 | Walker et al. |
| 6,168,523 | B1 | 1/2001 | Piechowiak et al. |
| 6,174,233 | B1 | 1/2001 | Sunaga et al. |
| 6,174,235 | B1 | 1/2001 | Walker et al. |
| 6,186,894 | B1 | 2/2001 | Mayeroff |
| 6,190,255 | B1 | 2/2001 | Thomas et al. |
| 6,224,483 | B1 | 5/2001 | Mayeroff |
| 6,231,442 | B1 | 5/2001 | Mayeroff |
| 6,231,445 | B1 | 5/2001 | Acres |
| 6,254,481 | B1 | 7/2001 | Jaffe |
| 6,270,411 | B1 * | 8/2001 | Gura et al. ...................... 463/20 |
| 6,309,300 | B1 * | 10/2001 | Glavich .................. G07F 17/32 463/16 |
| 6,311,976 | B1 | 11/2001 | Yoseloff et al. |
| 6,319,124 | B1 | 11/2001 | Baerlocher et al. |
| 6,347,996 | B1 * | 2/2002 | Gilmore .................. G07F 17/32 273/139 |
| 6,375,570 | B1 | 4/2002 | Poole |
| 6,443,837 | B1 | 9/2002 | Jaffe et al. |
| 6,520,855 | B2 * | 2/2003 | DeMar ................ G07F 17/3267 273/138.2 |
| 6,561,900 | B1 | 5/2003 | Baerlocher et al. |
| 6,602,136 | B1 | 8/2003 | Baerlocher et al. |
| 6,602,137 | B2 | 8/2003 | Kaminkow et al. |
| 6,607,438 | B2 | 8/2003 | Baerlocher et al. |
| 6,632,140 | B2 | 10/2003 | Berman et al. |
| 6,632,141 | B2 | 10/2003 | Webb et al. |
| 6,780,109 | B2 | 8/2004 | Kaminkow |
| 6,786,819 | B2 | 9/2004 | Baerlocher et al. |
| 2003/0013519 | A1 | 1/2003 | Bennett |
| 2007/0191093 | A1 | 8/2007 | Bennett |

FOREIGN PATENT DOCUMENTS

| | | |
|---|---|---|
| AU | 759129 | 8/2001 |
| WO | WO 98/09259 | 3/1998 |
| WO | WO 00/32286 | 6/2000 |

OTHER PUBLICATIONS

International Preliminary Examination Report of PCT/AU01/00044, dated May 23, 2001.

* cited by examiner

GAMING MACHINE WITH INTERACTIVE BONUSING

CROSS-REFERENCE TO RELATED APPLICATION(S)

This application claims priority to and is a continuation of Ser. No. 11/704,590, filed Feb. 2, 2007, which claims priority to and is a continuation of U.S. patent application Ser. No. 10/182,427 filed Jul. 25, 2002, which claims priority to and the benefit of International application number PCT/AU01/00044, filed Jan. 18, 2001, which in turn claims priority to and the benefit of Australian application number PQ 5564, filed Feb. 11, 2000, the entire contents of each of which are incorporated herein by reference.

FIELD OF THE INVENTION

This invention relates to a gaming machine. More particularly, the invention relates to a gaming machine and to an improvement to a game played on such a gaming machine.

BACKGROUND TO THE INVENTION

Players who regularly play gaming machines quickly tire of particular games and therefore it is necessary for manufacturers of these machines to develop innovative game features which add interest to the games. In so doing, it is hoped to keep players amused and therefore willing to continue playing the game as well as to attract new players.

Also with the growth that has occurred in the gaming machine market, there is intense competition between manufacturers to supply various existing and new venues. When selecting a supplier of gaming machines, the operator of a venue will often pay close attention to the popularity of various games with their patrons. Therefore, gaming machine manufacturers are keen to devise games which are popular with the Players as a mechanism for improving sales, retaining customers and attracting new customers.

SUMMARY OF THE INVENTION

According to the invention, there is provided a gaming machine having a display means and a game control means arranged to control images displayed on the display means, the game control means being arranged to play a game wherein one or more random events are caused to be displayed on the display means and, if a predefined winning event or combination of events results, the machine awards a prize, the gaming machine being characterised in that a predetermined symbol from a set of symbols of the game is selected as a bonus symbol and in that the display means is an interactive display means such that, when at least one of the bonus symbols appears then, by a player touching a part of the display means overlying the, or each, occurrence of the bonus symbol, a bonus prize is revealed in respect of the, or each, bonus symbol.

The set of symbols may be a set of standard symbols of the game or a predetermined subset of that set of standard symbols.

The, or each bonus symbol may be revealed in an animated manner such as the symbol which was touched by the player transforming into another symbol or indicium representative of a prize.

Further, it is to be understood that, in this specification, the term "symbol" relates to a symbol on a spinning reel-type game and, more particularly, a video simulation of such a spinning reel game, a card of a card game, a ball of a Keno game, or the like.

The feature may be applicable in respect of a base game. Instead, or in addition, the feature may be applicable in respect of a feature game which is triggered upon fulfillment of predetermined conditions. For example, in respect of a spinning reel-type game, the feature game may be triggered upon the occurrence of three predetermined special symbols.

The feature allowing the player to touch the screen to reveal the, or each, bonus symbol may be triggered by a predetermined event. Then, after the predetermined event has occurred, the control means may select a symbol from the set of symbols, or the subset of the set of symbols, to be the bonus symbol. Instead, the feature allowing the player to touch the screen to reveal the, or each, bonus symbol may be applicable for all games played.

In another embodiment, the, or each, bonus symbol may be selected by 20 the player.

BRIEF DESCRIPTION OF THE DRAWINGS

The invention is now described by way of example with reference to the accompanying diagrammatic drawings in which.

DETAILED DESCRIPTION OF THE DRAWINGS

Figure 1:
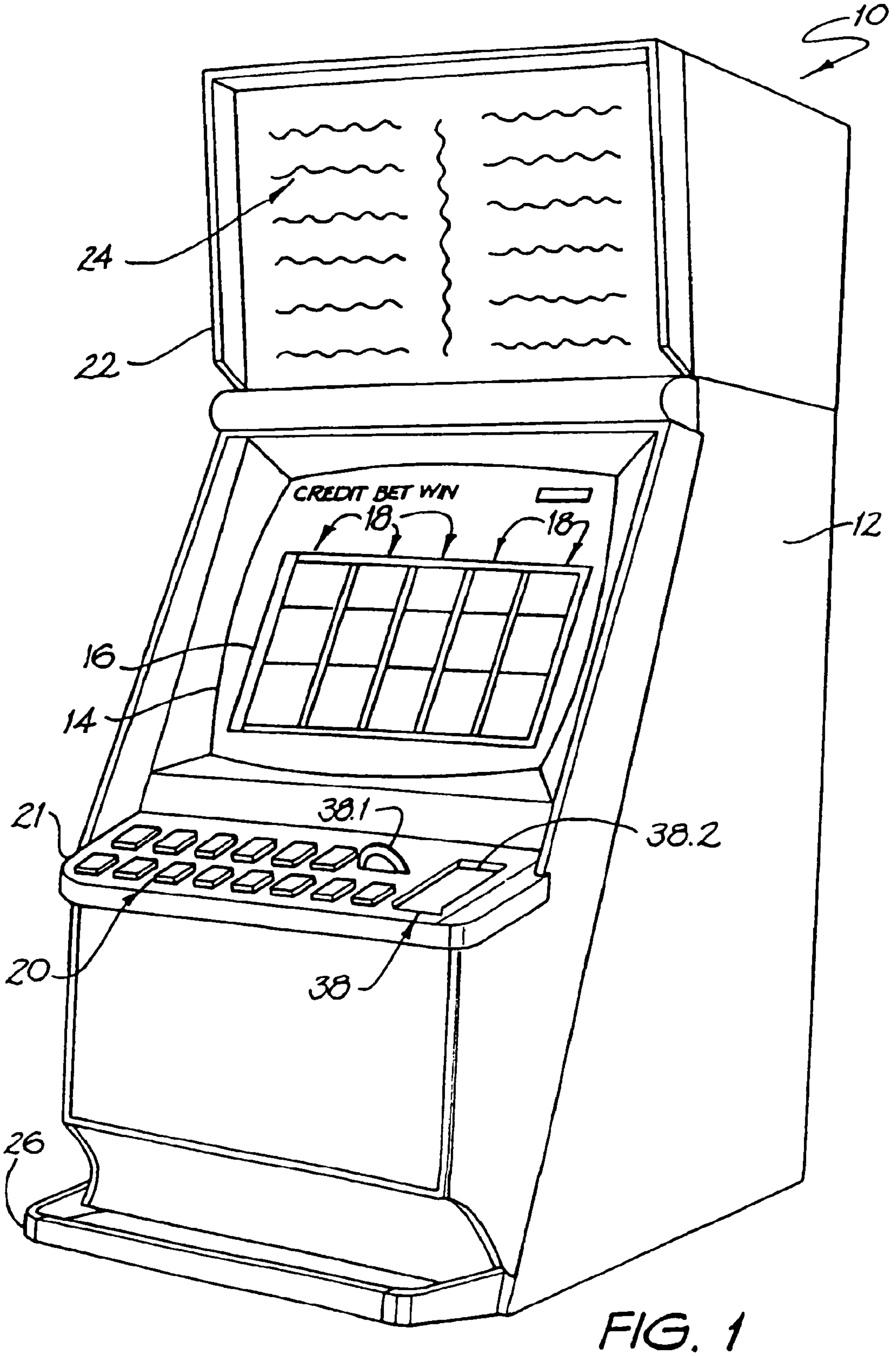
FIG. 1 shows a three dimensional view of a gaming machine, in accordance with the invention.

In FIG. 1, reference numeral 10 generally designates a gaming machine, including a game, in accordance with the invention. The machine 10 includes a console 12 having a video display unit 14 on which a game 16 is displayed. in use. The game 16 is a spinning reel game which simulates the rotation of a number of spinning reels 18. A keypad 20, arranged on a midtrim 21 of the console 12, facilitates playing of the game 16.

The machine 10 includes a top box 22 on which artwork 24 is carried. The artwork 24 includes paytables, details of bonus awards. etc.

A coin tray 26 is mounted beneath the console 12 for cash payouts from the machine 10.

Figure 2:
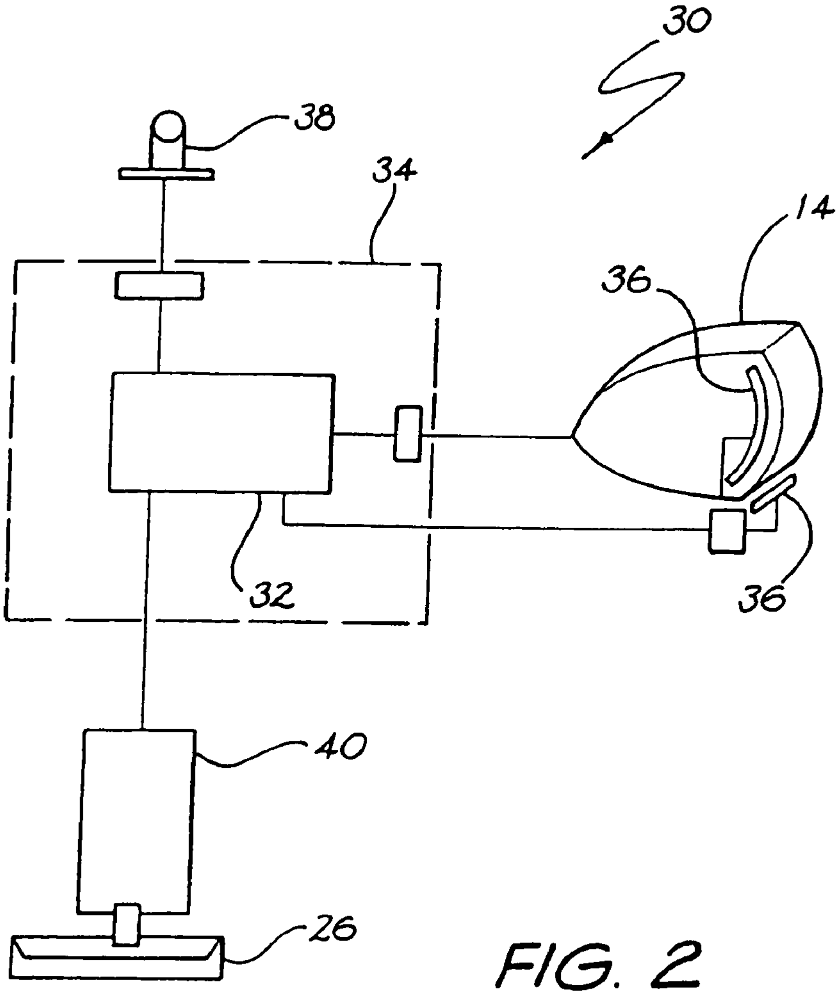
FIG. 2 shows a block diagram of a control circuit of the gaming machine.

Referring now to FIG. 2 of the drawings, a control means or control circuit 30 is illustrated. A program which implements the game and user interface is run on a processor 32 of the control circuit 30. The processor 32 forms part of a controller 34 which drives the screen of the video display unit 14 and which receives input signals from sensors 36. The sensors 36 include sensors 36 associated with the keypad 20 and touch sensors mounted in a screen of the video display unit 14.

The controller 34 also receives input pulses from a mechanism 38 indicating that a player has provided sufficient credit to begin playing. The mechanism 38 may be a coin input chute 38.1 (FIG. 1), a bill collector 38.2, a credit card reader (not shown), or any other type of validation device.

Finally, the controller 34 drives a payout mechanism 40 which, for example, may be a coin hopper for feeding coins to the coin tray 26 to pay a prize once a predetermined combination of symbols carried on the reels 18 appears on the screen 16 or some other prize winning event occurs.

With a game played on the gaming machine 10 of the invention, for example, a spinning reel game, a bonusing feature is triggered by a pre-determined event or, instead, may exist for all games played. For ease of explanation, the invention will be described below with reference to its application to a spinning reel type game. It will, however, be appreciated that the invention is applicable to other gaming machine games such as card games, ball-type games such as Keno games, or the like.

In use, the game commences in a conventional way upon actuation of the game via the keypad 20. The player is given the opportunity to touch one or more of the standard symbols of the actual reels 18 and, if necessary, is prompted to do so. When the player touches the screen overlying the appropriate symbols, this is sensed by the sensors 36 of the screen. The sensors 36 send the appropriate command to the processor 32. The processor 32 then causes prizes to be revealed in the same location as the touched symbol by way of an animation technique which transforms the symbol to a win-indicating indicium or by using some other, similar method. Similarly, the symbol may transform into something other than an indicium representing a win. For example, the symbol may transform into one representing another bonus symbol.

Figure 3A:
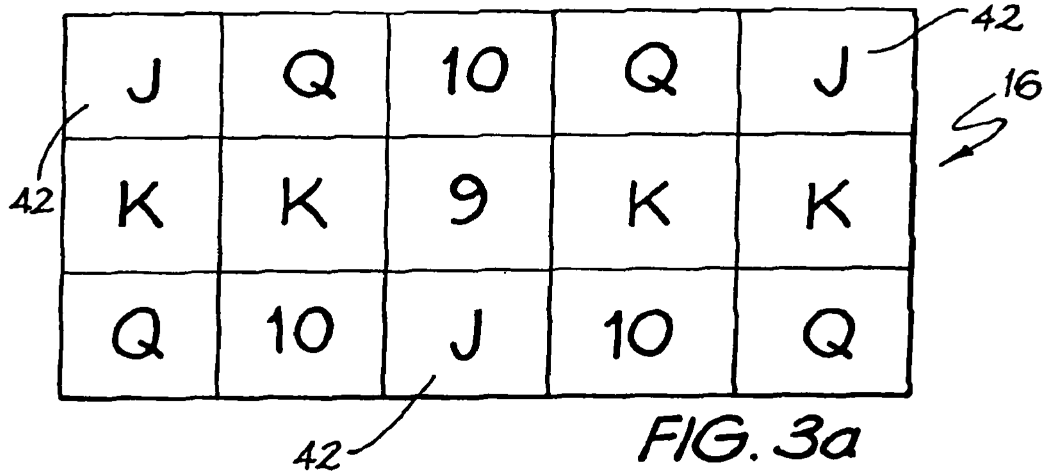
FIGS. 3*a* to 3*d* show display screens of a first embodiment of a game played on the gaming machine of FIG. 1.

A first embodiment of the game 16 is now described with reference to FIGS. 3*a* to 3*d* of the drawings. In this embodiment, the result of a base game is shown in FIG. 3*a* of the drawings. While this embodiment is described with reference to the game 16 being a base game it will be appreciated that the game 16 could also be a feature game resulting from a base game.

One of the symbols is designated as a bonus symbol. The designation of the bonus symbol could occur randomly or by some predetermined process. Instead, the bonus symbol may be selected by the player. A further possibility is that the bonus symbol may be fixed in that the same symbol is always the bonus symbol for every base game or feature game, as the case may be.

Figure 3B:
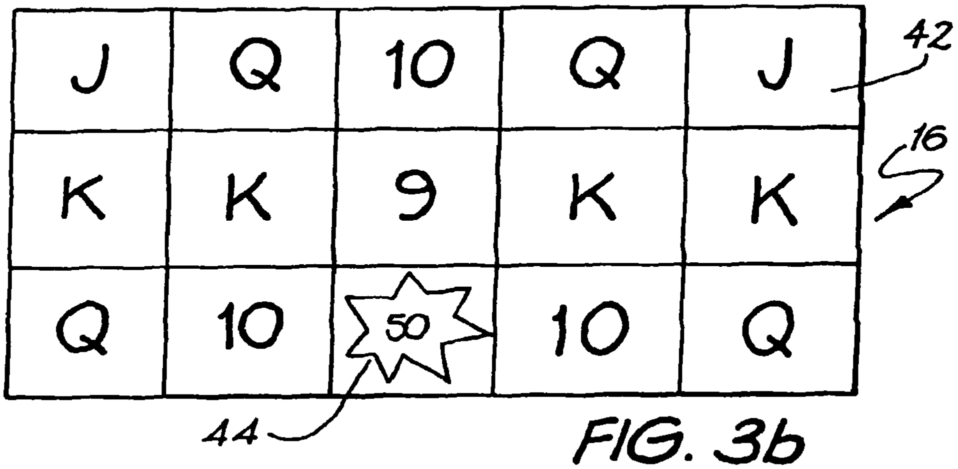
Figure 3C:
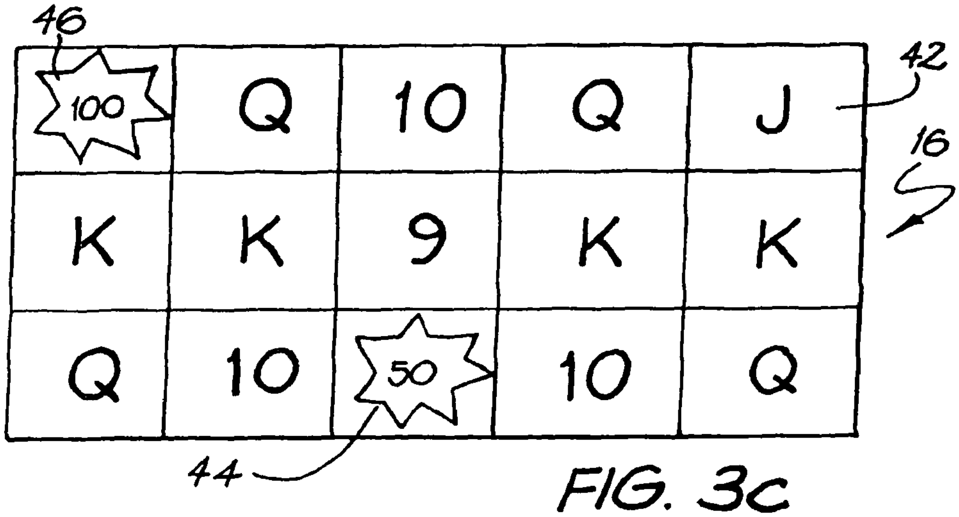
Figure 3D:
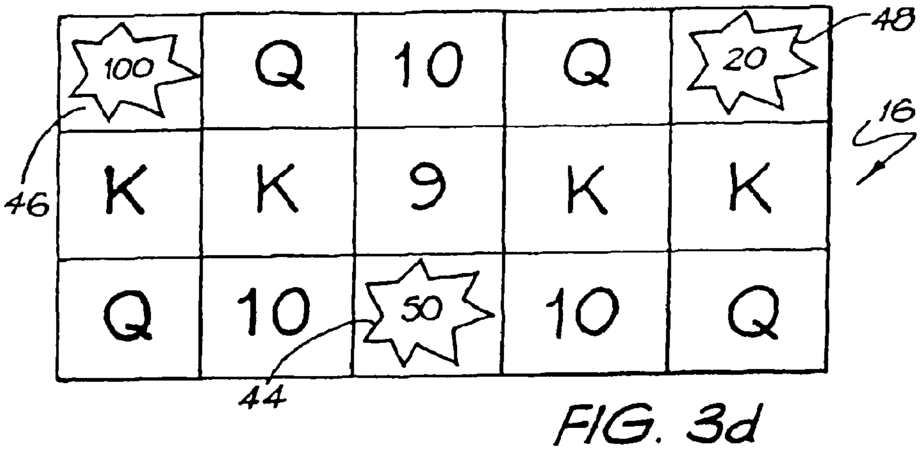

In the embodiment illustrated in FIGS. 3*a* to 3*d* of the drawings, the J symbol 42 is selected as the bonus symbol. When the screen of FIG. 3*a* is displayed, the player touches the screen of tile video display unit overlying one of the J symbols 42 to reveal a first bonus prize 44, as illustrated in FIG. 3*b* of the drawings. The screen overlying a second of the symbols 42 is then touched by the player to reveal a second bonus prize 46 as illustrated in FIG. 3*c* of the drawings. The screen overlying the third J symbol 42 is touched by the player to reveal a final bonus prize 48.

Figure 4A:
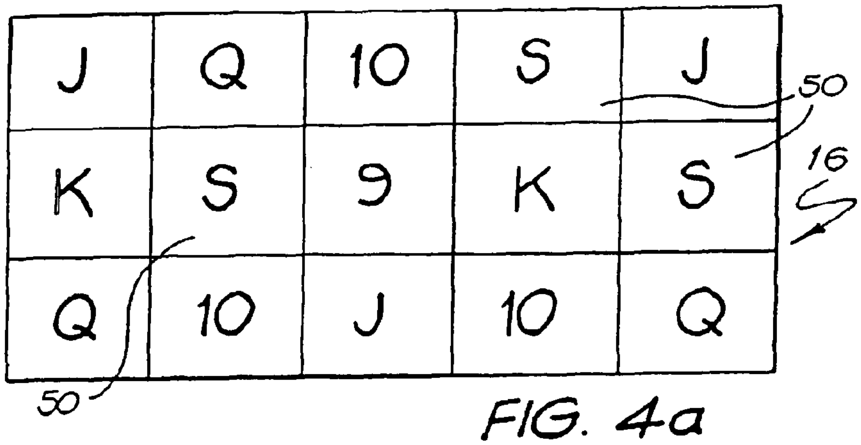
FIGS. 4*a* to 4*h* show display screens of a second embodiment of a game played on the gaming machine.
Figure 4B:
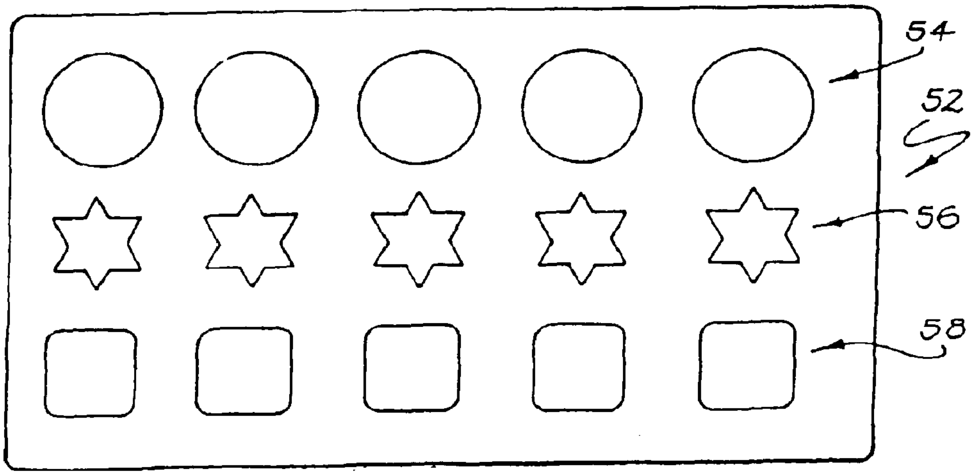

Referring now to FIGS. 4*a* to 4*h* of the drawings, a second embodiment of the game 16 is illustrated. In this embodiment, the screen display illustrated in FIG. 4*a* of the drawings is the result of a base game. The presence of 3 S symbols 50 causes a second screen feature game to commence having a screen display 52 as shown in FIG. 4*b* of the drawings. It is to be noted in FIG. 4*b* of the drawings that the initial screen display 52 of the second screen feature game comprises three rows 54, 56 and 58 of symbols. The symbols in the row 54 are, initially, visually the same as each other. Similarly, the symbols in the row 56 are, initially, visually the same as each other and the symbols in the row 58 are also, initially, visually the same as each other.

When the screen display 52 occurs, the player touches the screen overlying one symbol from each row 54, 56 and 58. Hence, when the player touches the screen overlying one of the symbols in the row 54, the selected symbol transforms into a tree game indicator as shown at 60 in FIG. 4*c* of the drawings. This indicates to the player the number of free games which the player has won.

The player then touches the screen overlying one of the symbols in the row 56. The selected symbol transforms itself as shown at 62 in FIG. 4*d* of the drawings to reveal a free game multiplier. The multiplier shows the number by which all win will be multiplied during the sequence of free games.

Figure 4C:
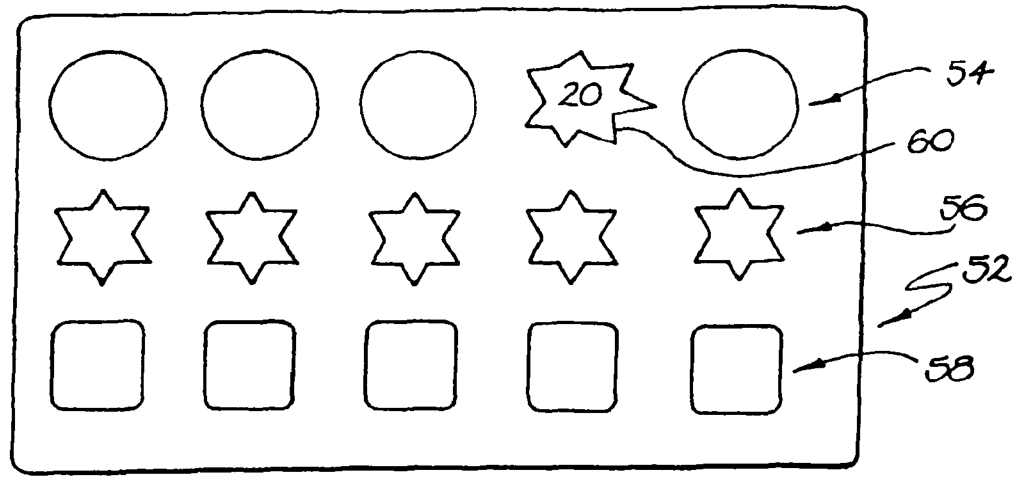
Figure 4D:
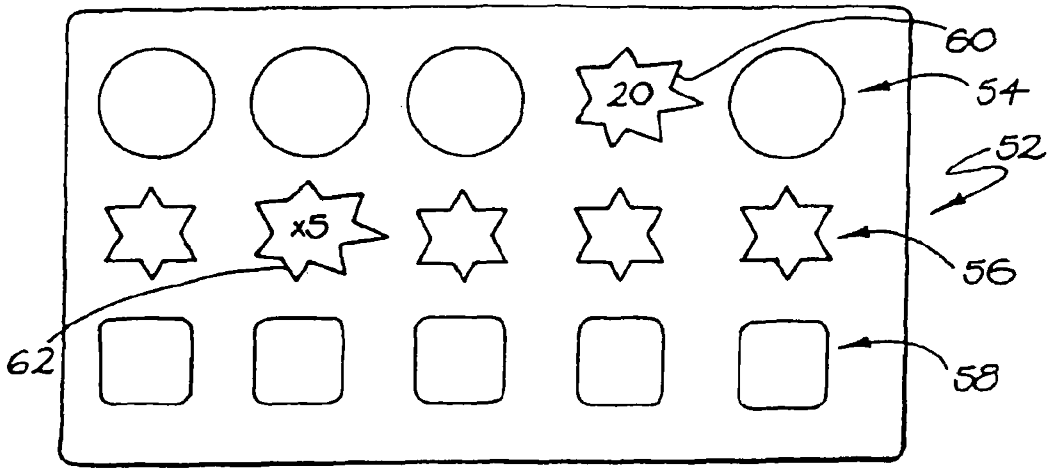
Figure 4E:
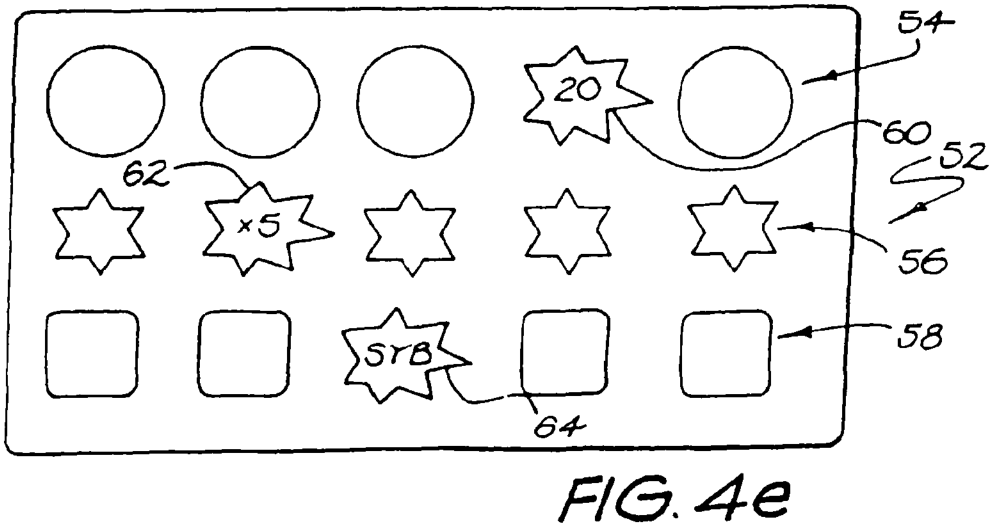

Finally, the player touches the screen overlying one of the symbols in the row 58 to cause the selected symbol to transform itself into a symbol 64 as shown in FIG. 4*e* of the drawings. This symbol 64 indicates to the player which symbol in the free games which will follow will be a bonus symbol.

Upon completion of the steps shown in FIGS. 4*c* to 4*e* of the drawings, a series of free games commences. The number of free games which the player is awarded is as indicated by the symbol in the row 54 of the second screen 52 revealed by the player having touched that part of the screen.

Figure 4F:
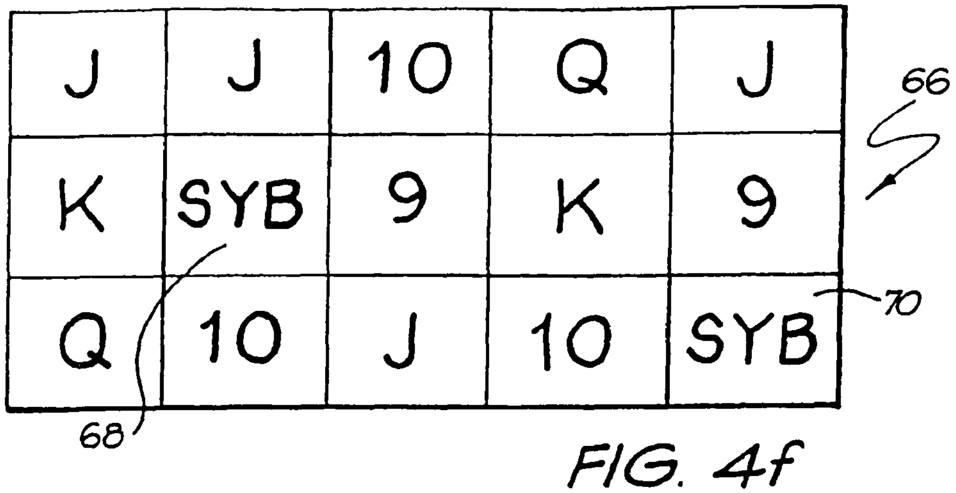
Figure 4G:
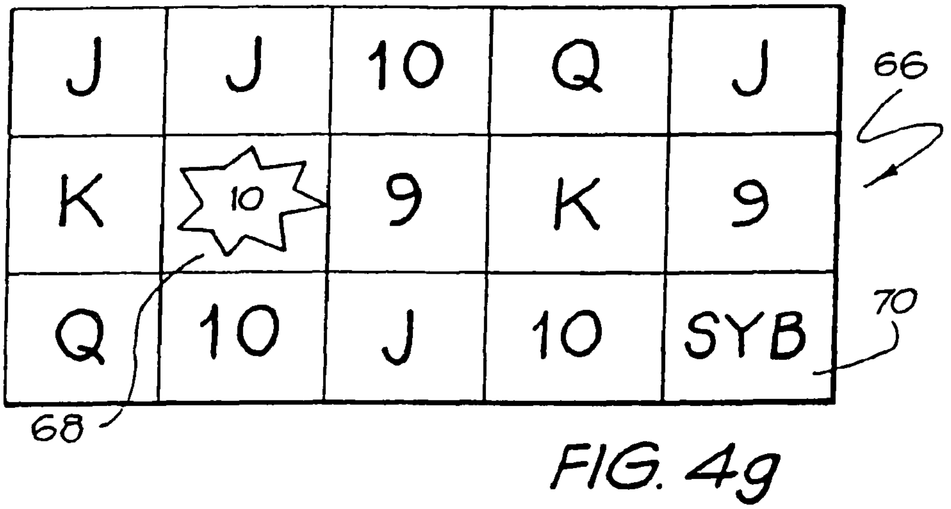
Figure 4H:
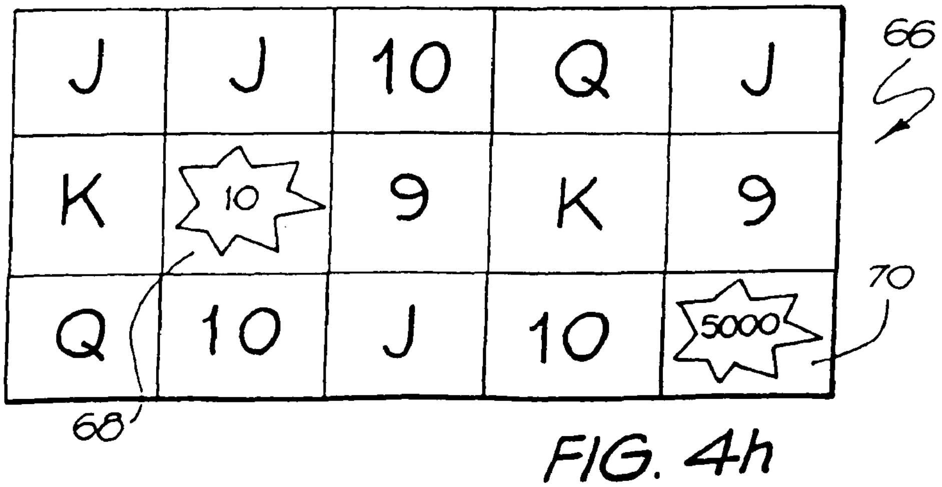
Figure 5:
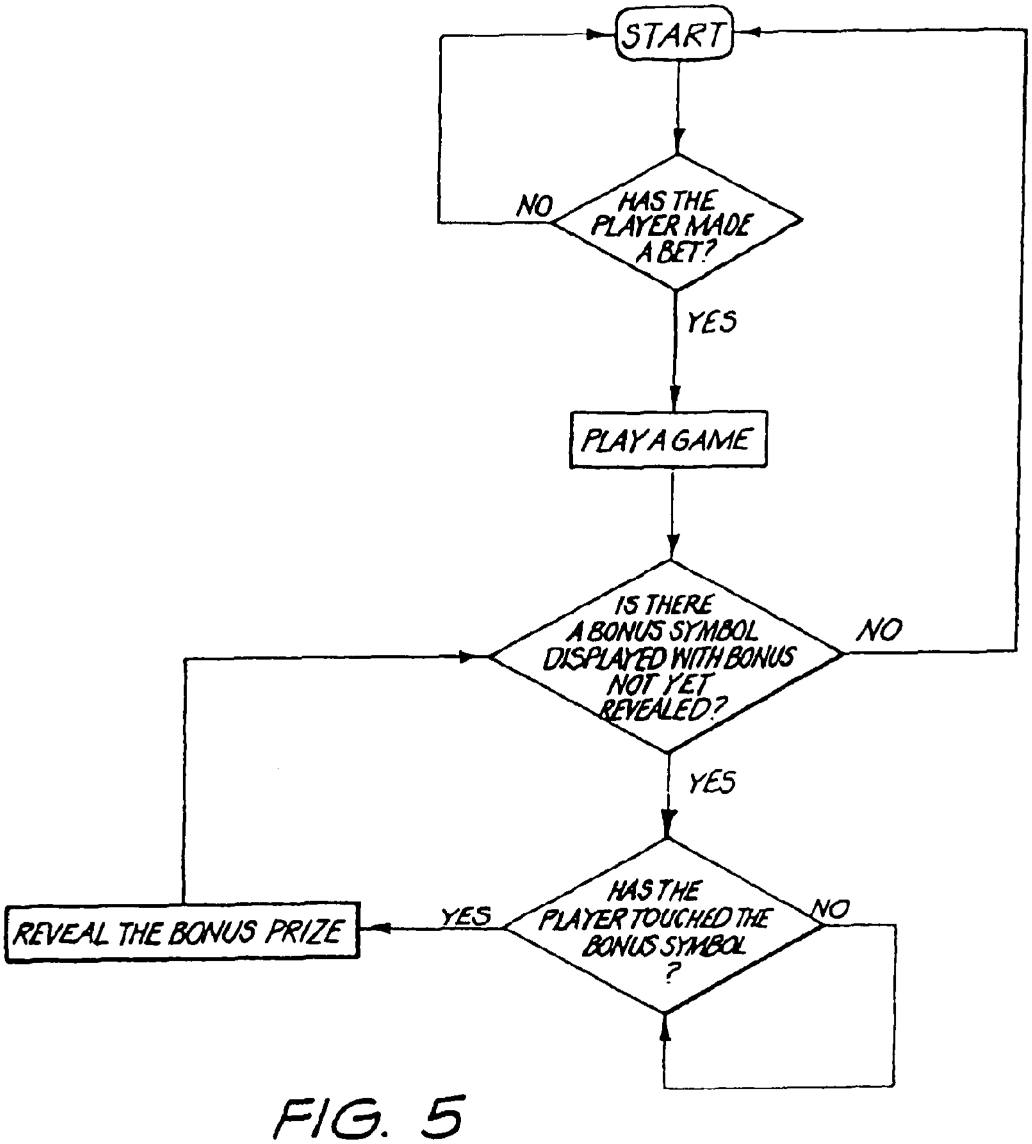
FIG. 5 shows a flow chart of the game of FIG. 3.
Figure 6:
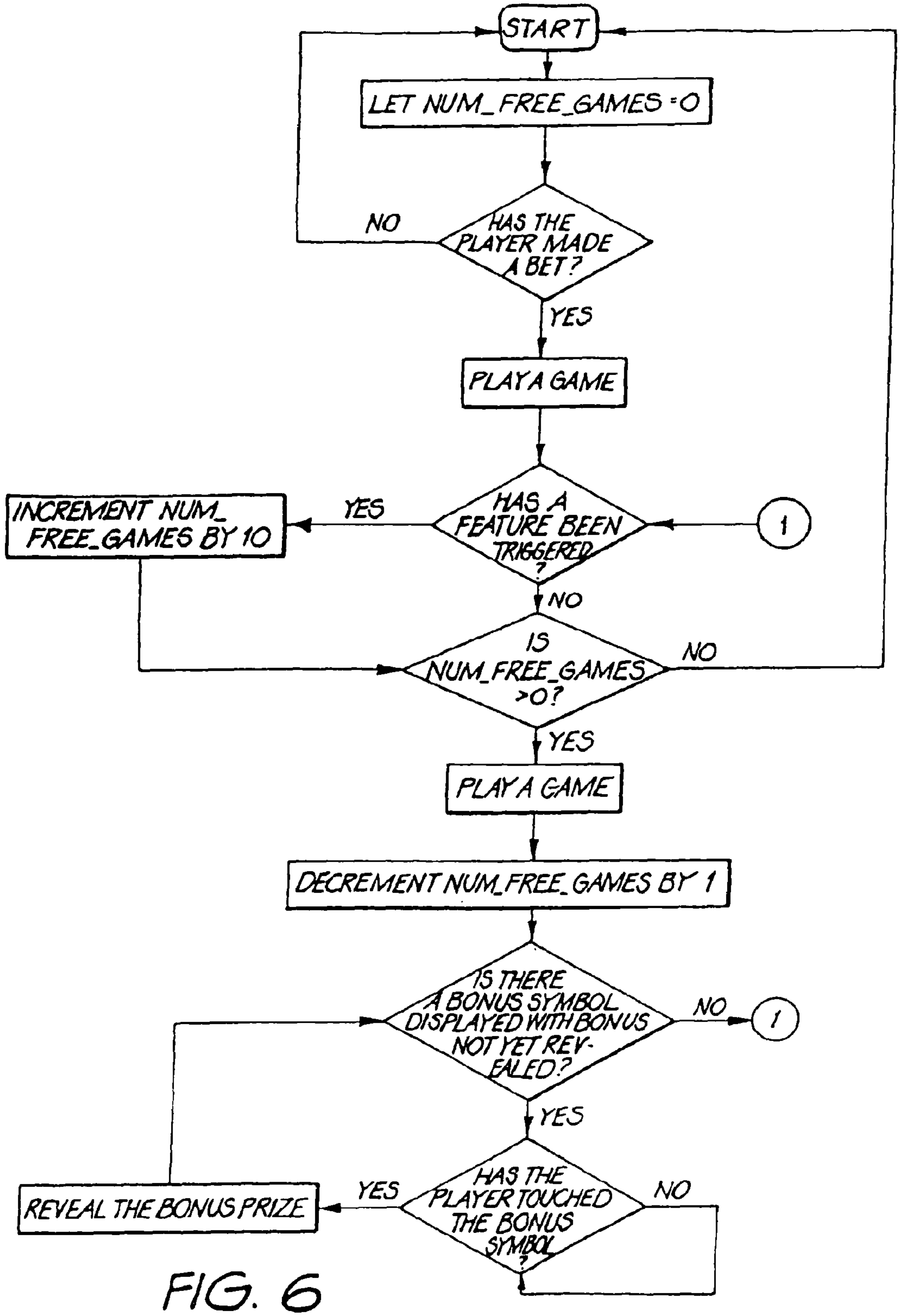
FIG. 6 shows a flow chart of the game of FIG. 4.

The screen of one of the free games is shown in FIGS. 4*f* to 4*h* of the drawings and is designated generally by the reference numeral 66.

When the reels 18 of the first free game cease spinning to reveal the screen 66, after all applicable wins have been paid and have been multiplied by the multiplier of the selected symbol in the row 56 of the initial screen display of the second screen feature 52, the player touches the screen overlying the first special symbol 68 to reveal what bonus prize has been awarded. As shown in FIG. 4*g*, a bonus prize of ten credits is awarded. The player then touches the screen overlying the second special symbol 70 to reveal a further bonus prize as illustrated in FIG. 4*h* of the drawings.

The free games continue in this manner until all the free games have been awarded after which the game returns to the normal spinning reel game without bonuses until the next feature is triggered.

Hence, it is an advantage of the invention that a gaming machine 10 is provided with more player interaction which, the applicant believes, will result in greater player interest.

It will be appreciated by persons skilled in the art that numerous variations and/or modifications may be made to the invention as shown in the specific embodiments without departing from time spirit or scope of the invention as broadly described. The present embodiments are, therefore, to be considered in all respects as illustrative and not restrictive.

What is claimed is:

1. A gaming machine comprising:

a gaming display;

at least one of a coin input chute, a bill collector, a credit card reader, and a validation device through which a credit wager is received from a player for a number of games;

a selection interface configured to sense the touching of a portion of the gaming display and to transmit to the game controller a signal indicative of the touching of the portion of the gaming display; and a game controller arranged to control one or more images displayed on the gaming display, the game controller being arranged to play the number of games wherein:

a plurality of game symbols are selected from a set of game symbols and displayed on the gaming display to facilitate play of the number of games, wherein a first type of the selected plurality of game symbols is associated with hidden symbol information, and wherein, when said first type of game symbol is further selected by the player, the hidden symbol information reveals one of the plurality of game symbols used to facilitate play of the number of games, the revealed symbol being designated a game bonus symbol, wherein hidden bonus information is associated with the designated game bonus symbol such that the hidden bonus information is not viewable on the gaming display, and wherein a number of game bonus symbols are randomly selected for display during play of the number of games;

at least two attributes are selected by the player, the at least two attributes including a first attribute that defines the number of games and a second attribute that is associated with the revealed designated game bonus symbol to affect outcomes of the number of games;

by a player touching a portion of the gaming display corresponding to each of the first type of game symbols designated to be the game bonus symbol, the hidden bonus information is revealed on the gaming display at the portion of the gaming display corresponding to respective ones of the game bonus symbols, wherein a prize corresponding to the hidden bonus information for each of the respective game bonus symbols is awarded in accordance with said second selected attribute, and wherein play of the number of games progresses based on the number of games defined by said first attribute; and a payout is determined based on the credit wager and a game outcome of the number of games.

2. The gaming machine of claim 1, wherein the bonus information is revealed in an animated manner.

3. The gaming machine of claim 1, wherein the game comprises a feature game triggered upon the occurrence of a predetermined condition in a base game.

4. The gaming machine of claim 1, wherein the game controller selects the game bonus symbol.

5. The gaming machine of claim 1, wherein the gaming machine is configured to allow the player to select the game bonus symbol.

6. The gaming machine of claim 1, wherein the hidden bonus information comprises at least one of a prize credit value, a bonus game indicator indicating a number of one or more bonus games awarded or a multiplier indicating a number by which one or more wins will be multiplied during a series of one or more consecutive games.

7. The gaming machine of claim 1, wherein the bonus information is revealed in an animated manner.

8. The gaming machine of claim 7, wherein the game comprises a feature game being triggered upon the occurrence of a predetermined condition in a base game.

9. The gaming machine as claimed in claim 1, further comprising a game parameter associated with play of the game, wherein the game parameter comprises at least one of the following:

a number of free spins of the game; and a prize multiplier to be applied to any prize awarded to the player during the game.

10. A method for use by a gaming machine, the method comprising:

receiving, via a selection interface, a touching of a portion of a gaming display and transmitting to a game controller a signal indicative of the touching of the portion of the gaming display;

receiving a credit wager for a number of games from a player, via at least one of a coin input chute, a bill collector, a credit card reader, and a validation device;

causing the game controller to control one or more images displayed on the gaming display;

causing the game controller to play the number of games wherein:

a plurality of game symbols are selected from a set of game symbols and displayed on the gaming display to facilitate play of the number of games, wherein a first type of the selected plurality of game symbols is associated with hidden symbol information, and wherein, when said first type of game symbol is further selected by the player, the hidden symbol information reveals one of the plurality of game symbols used to facilitate play of the number of games, the revealed symbol being designated a game bonus symbol, wherein hidden bonus information is associated with the designated game bonus symbol such that the hidden bonus information is not viewable on the gaming display, and wherein a number of game bonus symbols are randomly selected for display during play of the number of games;

at least two attributes are selected by the player, the at least two attributes including a first attribute that defines the number of games and a second attribute that is associated with the revealed designated game bonus symbol to affect outcomes of the number of games;

by a player touching a portion of the gaming display corresponding to each of the first type of game symbols designated to be the game bonus symbol, the hidden bonus information is revealed on the gaming display at the portion of the gaming display corresponding to respective ones the game bonus symbols, wherein a prize corresponding to the hidden bonus information for each of the respective game bonus symbols is awarded in accordance with said second selected attribute, and wherein play of the number of games progresses based on the number of games defined by said first attribute; and determining a payout to the player based on a game outcome of the number of games.

11. The method as claimed in claim 10, further comprising a game parameter associated with play of the game, wherein the game parameter comprises at least one of the following:

a number of free spins of the game; and a prize multiplier to be applied to any prize awarded to the player during the game.

12. The method of claim 10, wherein the bonus information is revealed in an animated manner.

13. The method of claim 10, wherein the game comprises a feature game triggered upon the occurrence of a predetermined condition in a base game.

14. The method of claim 10, wherein the hidden bonus information comprises at least one of a prize credit value, a bonus game indicator indicating a number of one or more bonus games awarded or a multiplier indicating a number by which one or more wins will be multiplied during a series of one or more consecutive games.

* * * * *